3,563,883
CATALYTIC REFORMING
Albert J. Westby, Port Arthur, Luther F. Champion, Houston, and William D. White and Leland A. Chvatal, Port Arthur, Tex., assignors to Texaco Inc., New York, N.Y., a corporation of Delaware
Filed Dec. 30, 1968, Ser. No. 806,766
Int. Cl. C10g *35/04, 39/00*
U.S. Cl. 208—63                                                    4 Claims

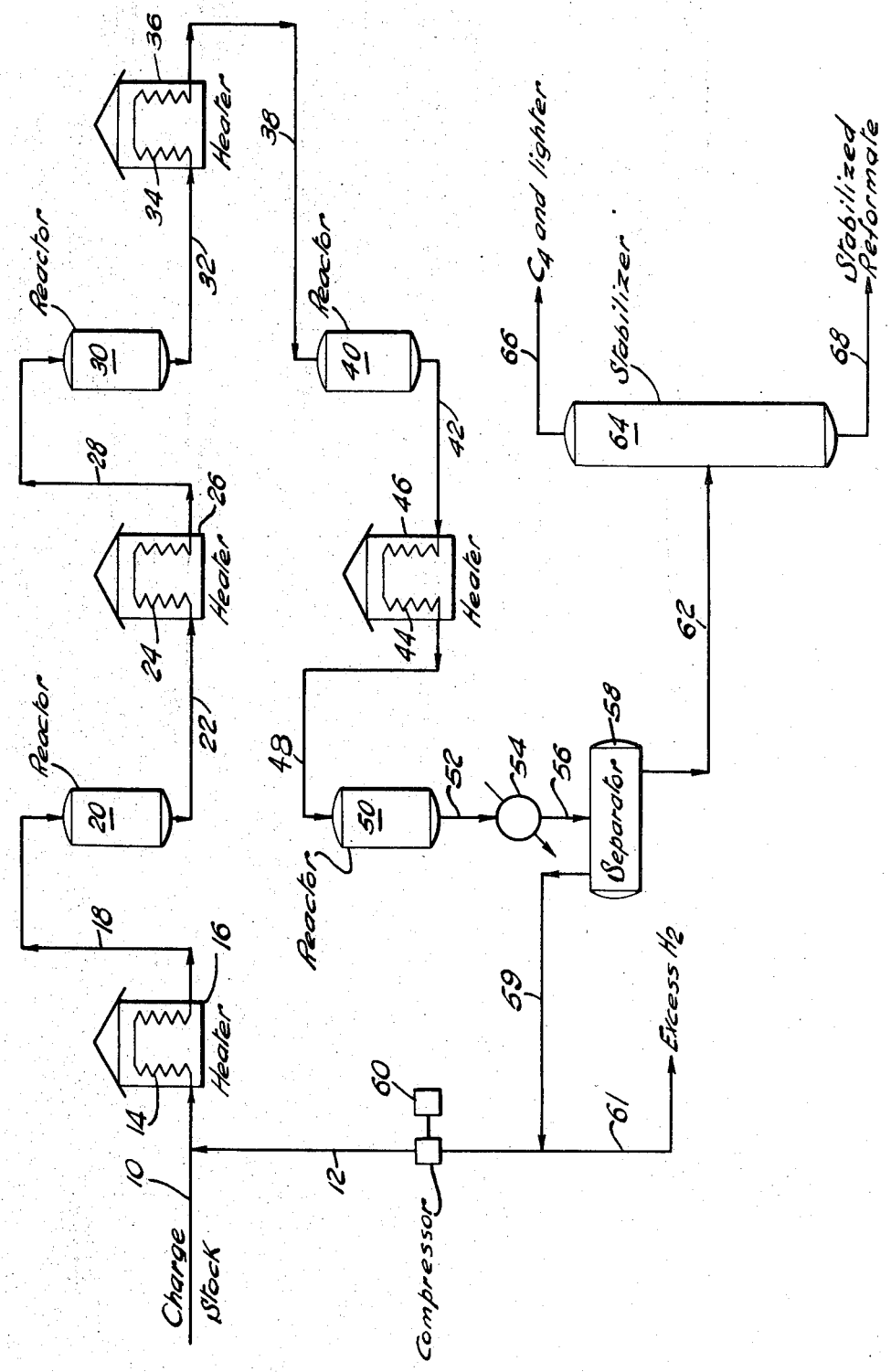

ABSTRACT OF THE DISCLOSURE

Improvements in catalytic reforming of hydrocarbons boiling in the gasoline range are achieved by operating a multireactor reforming process with the reactor inlet temperature profile having a "V-shaped" configuration. The temperature of the reaction mixture at the inlet to the second reactor is lower than at the inlet to the first reactor and in a three reactor unit, the inlet temperature to the third reactor is higher than that of the second reactor. Where a fourth reactor is utilized, the inlet temperature to the third reactor may be higher, lower or equal to that to the second reactor and the inlet temperature to the fourth reactor is higher than that to the third reactor.

BACKGROUND OF THE INVENTION

This invention relates to the catalytic conversion of hydrocarbons and, more particularly, it relates to the catalytic conversion of low octane gasoline components to higher octane gasoline components. In particular, this invention relates to an improved method of catalytically reforming low-octane gasoline, cycloparaffins (naphinvention is related to an improved reforming operation wherein the inlet temperatures to the several reactors bear a particular relationship to each other thereby producing a product with a substantially improved yield-octane relationship.

Catalytic reforming employing catalysts containing platinum group metals is widely used in the petroleum industry as a means of producing aromatics and improving the anti-knock characteristics of gasoline fractions. In reforming low-octane gasoline, cycloparaffins (naphthenes) are dehydrogenated to form aromatics, 5-membered ring naphthenes (alkyl cyclopentanes) are dehydroisomerized to produce aromatics, straight chain hydrocarbons are hydroisomerized to form more highly branched hydrocarbons, paraffins are dehydrocyclized to form aromatic compounds and long chain paraffins are hydrocracked into shorter chained hydrocarbons. These and other reactions, including hydrogen transfer and selective cracking, contribute to the improved anti-knock characteristics of the reformed product.

In the catalytic reforming of gasoline fractions, the dominating reaction is the dehydrogenation of naphthenes to aromatics; this reaction is highly endothermic. In order to maintain high conversion it is often necessary to maintain the reaction temperature at a level of about 850 to 1100° F. It is customary, therefore, to divide the catalytic reaction zone into a plurality of individual reactors with the reaction mixture flowing serially through the reactors and with re-heat of the reaction mixture between reactors. The dehydrogenation reaction proceeds rapidly and is largely completed in the first two or three reactors. In a typical catalytic reforming system the catalyst is divided into three and, often, four reactors. Since most of the dehydrogenation occurs in the early stages, re-heat is required more frequently and the initial reactor vessels are often smaller, i.e., contain less catalyst, than the final catalytic reforming reactor vessel. In the final reactor, the principal reaction is hydrocracking and hydroisomerization. Often, about 40 percent of the catalyst in the system is placed in the last reactor.

The effectiveness of the catalytic reforming operation is measured by the quality and quantity of the product obtained from it. The yield of reformate and its octane and/or the aromatics content of the reformate and its octane are the usual measures of operating performance.

It has been usual practice to operate a catalytic reforming unit with a "descending temperature profile," that is, the temperature of the reaction mixture to each downstream reactor is somewhat lower (in the order of about 5° F.) than that of the preceding upstream reactor. In a variation of this, an "even temperature profile" is sometimes employed wherein the temperature of the reaction mixture as it enters the several reactors in a serial fashion is substantially the same. In the past the particular mode of operation has usually been dictated by the quality of the charge stock being processed and the desired product quality. In all instances however, the operating conditions were selected to obtain the greatest yield of product, a product having the highest octane rating obtainable within economic and equipment limitations or a balanced combination of high yield and high octane. A method of operating a catalytic reforming unit which will significantly improve the reformate yield-octane level relationship obtainable heretofore is highly desirable.

SUMMARY OF THE INVENTION

By means of the process of our invention, improvements in a catalytic reforming operation are achieved. By employing the process of our invention an improvement in the reformate yield-octane and/or aromatics yield-octane relationship is obtained. Specifically, by operating a plurality of catalytic reactors in a reforming unit so that the inlet temperatures of the reaction mixtures to the several reactors are maintained in a particular relationship to each other, improved product quality is achieved.

More particularly, in the process of our invention a reforming process is operated wherein the inlet temperatures of the several reforming reactors are between about 850 and about 1100° F. and have a "V-shaped" profile. By "V-shaped" temperature profile we mean a reactor inlet temperature profile wherein the temperature of the reaction mixture at the inlet to the second reactor is lower than the temperature at the inlet to the first reactor and the inlet temperature to the last one in the series is higher than that to the penultimate reactor. For example, with a three reactor reforming unit an operable "V-shaped" inlet temperature profile for a given set of conditions would be: Reactor 1—950° F., reactor 2—925° F., and reactor 3—935° F. If a fourth reactor were employed, the inlet temperature to it could be, for example, 945° F. Although, the optimum inlet temperature to each reactor will be dependent on a variety of factors—feed quality, product quality demand, etc.—in general, the inlet temperature to the second of the series of reactors should be lower than that to the first reactor and, in a three reactor system, the inlet temperature to the third reactor should be higher than that to the second reactor. With a four reactor unit, the inlet temperature to the third reactor can be higher, lower or equal to the inlet temperature to the second reactor while the temperature to the fourth reactor is higher than that to the third.

The improved reforming process of our invenion produces a stabilized gasoline with a higher octane rating at a given yield, or at a greater yield for a given octane, than has been obtained by known reforming processes.

BRIEF DESCRIPTION OF THE DRAWING

The accompanying drawing is a schematic flow diagram of an embodiment of the process units and flow systems suitable for carrying out the process of the present invention.

DESCRIPTION OF THE PREFERRED EMBODIMENT

In accordance with the present invention, a multi-reactor reforming unit is operated to produce a stabilized gasoline of substantially higher yield and octane quality than was possible heretofore by maintaining the temperature of the reaction mixture at the inlet to the several reactors in a "V-shaped" profile configuration.

Our invention may be understood from the following detailed description taken with reference to the accompanying drawing which illustrates diagrammatically an embodiment for practicing the method of our invention.

A charge stock of hydrocarbon liquid boiling in the gasoline range and having a low octane rating is introduced through line 10 and combined with recycle hydrogen from line 12 comprising about 80 to 95% hydrogen and passed through coil 14 in heater 16. In heating coil 14, the gasoline and hydrogen mixture is heated to a temperature of between 850 and 1100° F. and then passed through line 18 to reactor 20, containing a fixed bed of a solid reforming catalyst such as a platinum metal supported on a halogenated alumina base. As the reactants pass through the bed, the endothermic heat of reaction causes the temperature to drop so that the effluent from reactor 20 is at a significantly lower temperature than the entering mixture. This effluent passes through line 22 into coil 24 of heater 26 to reheat the reaction mixture before continuing the catalytic reforming reaction. The reaction mixture flows from heater 26 through line 28 into the second reactor, reactor 30, containing a fixed bed of reforming catalyst. The heating in heater 26 produces an inlet temperature to reactor 30 below the inlet temperature to reactor 20. Again the heat of reaction from the reforming process causes the temperature of the reaction mixture to drop so that the effluent from reactor 30 is discharged into line 32 at a temperature substantially below the inlet temperature. The reaction mixture is again reheated by coil 34 in heater 36, discharging into line 38 and passing into the third reactor, reactor 40. The heat supplied in heater 36 increases the temperature of the reaction mixture to provide an inlet temperature to reactor 40 which may be above, below, or equal to the inlet temperature to reactor 30. The reforming reaction is continued in reactor 40 by the fixed bed of catalyst therein and again results in a temperature decrease of the reaction mixture which discharges into line 42 and is reheated in coil 44 of heater 46. The reaction mixture discharges from the heater into the line 48 and passes into the fourth and final reactor, reactor 50. The heat input in heater 46 provides an inlet temperature to reactor 50 which is higher than the inlet temperature to reactor 40. The effluent from reactor 50 discharges through line 52, cooler 54 and line 56 to separator 58. Vapor and liquid phases separate in separator 58 with a recycle gas stream, rich in hydrogen, passing from separator 58 through line 59 into compressor 60 for reintroduction into feed line 10 through line 12. Since there is a net make of hydrogen in the reforming process, a hydrogen-rich stream is removed from the system through line 61. The liquid effluent flows from separator 58 through line 62 to stabilizer 64 where low boiling hydrocarbons such as butane and lighter are fractionated from the reformed product and pass overhead through line 66. Stabilized reformate is withdrawn from stabilizer 64 through line 68.

It will be appreciated by those familiar with petroleum reforming operations that the improvements of our invention have wide application and may be utilized with reforming units processing a wide variety of the usual charge stocks.

Since the improvements of our invention may be employed on the well known multi-reactor fixed catalyst reforming unit, its application is not limited to particular feedstocks or operating conditions, except for the required inlet temperature profile. Therefore any of the usual reforming feedstocks can be employed, such as, light or heavy straight-run gasoline from crude distillation units or other sources, as well as hydrotreated cracked gasolines from thermal or catalytic cracking units. The usual reforming conditions may be employed which, aside from the temperature relationship which is the subject of this invention and which is described in detail hereinafter, include: a conversion temperature between 850 and 1100° F., a pressure between about 200 and 700 p.s.i.g., hydrogen gas ranging from 2000 to 20,000 s.c.f./b. of fresh feed and a space velocity of between about 1 to 5 v./hr./v.

Designating the inlet temperature of the reaction mixture to reactors 1, 2, 3 etc. as $T_1$, $T_2$, $T_3$ etc., respectively, the V-shaped reactor inlet temperature profile we have found operable for a multi-reactor catalytic reforming unit should have the following relationship: each inlet temperature, $T_1$, $T_2$, $T_3$, etc., is between about 850 and about 1100° F., $T_1-T_2$ is between about 1 and 70° F., preferably between about 5 and 40° F., $T_1-T_3$ is between about $-35$ and $+55$ F., preferably between about $-20$ and $+40°$ F., and if the reforming unit comprises a fourth fixed bed reactor, $T_1-T_4$ is between about $-65$ and $+15°$ F., preferably between about $-40$ and $+5°$ F. In addition, $T_3$ must be greater than $T_2$ in a three reactor system and $T_4$ must be greater than $T_3$ in a four reactor system. As a rule of thumb and as a first approximation until one skilled in the art determines the optimum V-shaped profile for a particular situation, the following may be used: for a three reactor system, $T_1-T_2=25°$ F. and $T_1-T_3=5°$ F.; for a four reactor system, $T_1-T_2=25°$ F., $T_1-T_3=15°$ F. and $T_1-T_4=5°$ F.

It will be appreciated by those skilled in the art that the determination of the optimum "V-shaped" inlet temperature profile will depend on a variety of factors including feed charge quality, desired reformate quality, type of catalyst, its age and activity and percentage of the total catalyst charge present in each reactor. However, despite the variables the optimum temperatures will be within the temperature limits listed above.

The following examples illustrate the use of our invention in a process exemplified by the flow plan of the drawing.

A series of test runs was made on a commercial catalytic reforming unit comprising four reactor vessels, each containing a fixed bed of reforming catalyst comprising platinum on alumina and sold by the Universal Oil Products Company under the trade name UOP R–8. In each run the process unit was allowed to line out for about 24 hours at each set of operating conditions before test run data was taken. Each test run lasted for approximately 12 hours. The charge stock quality and the operating conditions employed in the several runs are set forth in Table I below.

TABLE I.—CHARGE STOCK PROPERTIES AND OPERATING CONDITIONS

| Run number | 1 | 2 | 3 | 4 | 5 | 6 | 7 |
|---|---|---|---|---|---|---|---|
| Type of temperature profile | Even | Descending | V | Even | V | Descending | V |
| Charge rate, b/hr | 667 | 667 | 667 | 708 | 708 | 750 | 750 |
| Inlet pressure, p.s.i.g | 513.6 | 513.9 | 513.8 | 537.6 | 539.1 | 506.4 | 505.8 |
| $H_2$:hydrocarbon mole ratio | 6.49 | 6.70 | 6.74 | 7.01 | 7.31 | 6.43 | 6.05 |
| Space velocity, $V_0/hr./V_c$ | 2.37 | 2.37 | 2.37 | 2.51 | 2.51 | 2.66 | 2.66 |
| Charge stock gravity | 53.83 | 54.20 | 53.10 | 54.33 | 54.77 | 54.19 | 54.60 |
| Charge stock analysis, vol. percent: | | | | | | | |
| Paraffins | 48.04 | 49.86 | 46.66 | 47.43 | 49.23 | 47.2 | 47.0 |
| Naphthenes | 38.63 | 37.37 | 39.67 | 37.27 | 38.10 | 39.0 | 41.4 |
| Aromatics | 13.33 | 12.77 | 13.67 | 15.30 | 12.67 | 13.8 | 11.6 |
| Reactor inlet temperatures, °F.: | | | | | | | |
| Reactor No: | | | | | | | |
| 1, $T_1$ | 945.5 | 955.0 | 954.9 | 945.0 | 955.0 | 944.7 | 945.0 |
| 2, $T_2$ | 945.0 | 949.9 | 930.0 | 945.1 | 929.9 | 939.7 | 919.5 |
| 3, $T_3$ | 944.9 | 943.9 | 940.0 | 944.9 | 939.9 | 933.6 | 929.6 |
| 4, $T_4$ | 944.9 | 938.0 | 949.9 | 945.0 | 949.9 | 927.5 | 939.6 |
| Severity* | 87.6 | 86.1 | 87.9 | 85.0 | 83.5 | 81.35 | 81.45 |
| Catalyst age, bbl./lb.: | | | | | | | |
| This run | 3.36 | 3.99 | 4.58 | 9.82 | 10.81 | 59.49 | 60.54 |
| Total | 212.2 | 212.79 | 3.35 | 218.71 | 219.70 | 268.38 | 269.43 |

*Research clear octane number of debutanized platformate.

In runs 1 and 4 an even inlet temperature profile was maintained. In runs 2 and 6 a descending temperature profile was employed. In runs 3, 5, and 7, a V-shaped inlet temperature profile was utilized. Runs 1, 2, 4, and 6 represent operating conditions employed heretofore in reforming processes and runs 3, 5 and 7 demonstrate the improved reforming process of our invention.

The product analysis and yield data of these runs are presented in Table II below.

TABLE II.—PRODUCT DATA

| Run number | 1 | 2 | 3 | 4 | 5 | 6 | 7 |
|---|---|---|---|---|---|---|---|
| Type of temperature profile | Even | Descending | V | Even | V | Descending | V |
| Raw data: | | | | | | | |
| Yields, vol. percent (fresh feed): | | | | | | | |
| Paraffins | 33.01 | 33.93 | 32.07 | 35.94 | 34.12 | 37.11 | 36.81 |
| Naphthenes | 5.10 | 5.10 | 5.18 | 5.92 | 5.58 | 6.65 | 7.05 |
| Aromatics | 38.33 | 37.24 | 41.31 | 37.14 | 38.99 | 39.05 | 39.52 |
| Total $C_6$ plus | 76.44 | 76.27 | 78.56 | 79.00 | 78.69 | 82.81 | 83.38 |
| Data adjusted to constant charge stock quality and severity: | | | | | | | |
| Severity* | 88.0 | 88.0 | 88.0 | 85.0 | 85.0 | 82.0 | 82.0 |
| Aromatics yield, vol. percent | 39.15 | 39.87 | 41.47 | 37.14 | 41.08 | 39.78 | 40.76 |
| Total $C_6$ plus yield, vol. percent | 77.09 | 76.29 | 78.50 | 78.96 | 79.08 | 82.62 | 84.32 |

*Research clear octane number of debutanized platformate.

It is seen that those runs utilizing the improvements of our invention produced a higher aromatics yield than those runs which employed the prior art techniques and further the yield of stabilized product, i.e., $C_6$ plus, for those runs employing the V-shaped temperature profile was significantly higher than those of the other runs.

These runs were made on a large commercial unit over a prolonged period of time with some variation in charge stock quality. To more accurately compare these test runs, all yield data were adjusted to a constant charge stock quality of 54.5° API, 46.5% paraffins, 39.5% naphthenes and 14.0% aromatics with a constant reforming severity of 88.0 for runs 1, 2 and 3, 85.0 for runs 4 and 5, and 82.0 for runs 6 and 7. These results are also presented in Table II.

Eeven when the data are adjusted to a constant feed charge quality and constant severity, the improved aromatic yield-octane relationship achieved by the process of our invention is apparent.

Obviously many modifications and variations of our invention as hereinbefore set forth, may be made without departing from the nature and scope thereof and therefore only such limitations should be imposed as are indicated in the appended claims.

We claim:

1. In a process for improving the octane rating of hydrocarbons boiling in the gasoline range wherein a mixture of hydrocarbons and hydrogen is passed serially through three reforming zones in contact with a reforming catalyst under reforming conditions and wherein the mixture is subjected to heating between the several reforming zones, the improvement which comprises:
   (a) heating the effluent from the first reforming zone to provide a mixture having a temperature $T_2$ at the inlet to the second reforming zone which is lower than the temperature $T_1$ of the mixture at the inlet to the first reforming zone, and
   (b) heating the effluent from the second reforming zone to provide a mixture having a temperature $T_3$ at the inlet to the third reforming zone which is higher than $T_2$, said $T_1$, $T_2$ and $T_3$ being between about 850 and about 1100° F., $(T_1-T_2)$ being between about 1 and 70° F., and $(T_1-T_3)$ being between about −35 and +550° F.

2. A process according to claim 1 wherein $(T_1-T_2)$ is between about 5 and 40° F., and $(T_1-T_3)$ is between about −20 and +40° F.

3. In a process for improving the octane rating of hydrocarbons boiling in the gasoline range wherein a mixture of hydrocarbons and hydrogen is passed serially through four reforming zones in contact with a reforming catalyst under reforming conditions and wherein the mixture is subjected to heating between the several reforming zones, the improvement which comprises:
   (a) heating the effluent from the first reforming zone to provide a mixture having a temperature $T_2$ at the inlet to the second reforming zone which is lower than the temperature $T_1$ of the mixture at the inlet to the first reforming zone,
   (b) heating the effluent from the second reforming zone to provide a mixture having a temperature $T_3$ at the inlet to the third reforming zone higher than the temperature at the outlet of the second reforming zone, and
   (c) heating the effluent from the third reforming zone to provide a mixture having a temperature $T_4$ at the inlet to the fourth reforming zone which is higher than $T_3$, said $T_1$, $T_2$, $T_3$ and $T_4$ being between about 850 and about 1100° F., $(T_1-T_2)$ being between about 1 and 70° F., $(T_1-T_3)$ being between about −35 and +55° F., and $(T_1-T_4)$ being between about −65 and +15° F.

4. A process according to claim 3 wherein $(T_1-T_2)$ is between about 5 and 40° F., $(T_1-T_3)$ is between about −20 and +40° F., and $(T_1-T_4)$ is between about −40 and +5° F.

References Cited

UNITED STATES PATENTS

| | | | |
|---|---|---|---|
| 2,965,560 | 12/1960 | Smith | 208—65 |
| 3,142,545 | 7/1964 | Raarup et al. | 208—65 |

DELBERT E. GANTZ, Primary Examiner

R. BRUSKIN, Assistant Examiner

PO-1050
(5/69)

UNITED STATES PATENT OFFICE
CERTIFICATE OF CORRECTION

Patent No. 3,563,883          Dated June 24, 1971

Inventor(s) ALBERT J. WESTBY, LUTHER F. CHAMPION, WILLIAM D. WHITE and LELAND A. CHVATAL It is certified that error appears in the above-identified patent and that said Letters Patent are hereby corrected as shown below:

Column 1, line 34, following "reforming" insert --a--; line 34, ", cycloparaffins (naph-" should read--. More particularly, this --; line 44, "(naphth-" should read -- (naph- --. Column 3, line 9, "invenion" should read --invention--. Columns 5-6, Table I, Run Number 3, last line of data, "3.35" should read --213.35--. Column 5, line 61, "Eeven" should read --Even--. Column 6, line 51, "550" should read --55--.

Signed and sealed this 2nd day of November 1971.

(SEAL)
Attest:

EDWARD M. FLETCHER, JR.      ROBERT GOTTSCHALK
Attesting Officer               Acting Commissioner of Patents